United States Patent [19]
Sadatoshi et al.

[11] Patent Number: 6,087,443
[45] Date of Patent: *Jul. 11, 2000

[54] THERMOPLASTIC RESIN COMPOSITION

[75] Inventors: Hajime Sadatoshi; Haruyuki Suzuki, both of Chiba, Japan

[73] Assignee: Sumitomo Chemical Company, Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/638,754

[22] Filed: Apr. 29, 1996

[30] Foreign Application Priority Data

Apr. 28, 1995 [JP] Japan .................................. 7-106761

[51] Int. Cl.[7] .......................... C08L 23/26; C08F 297/08
[52] U.S. Cl. ............................. 525/88; 525/89; 525/193; 525/194
[58] Field of Search ............................. 525/88, 193, 194, 525/89

[56] References Cited

U.S. PATENT DOCUMENTS

| | | | |
|---|---|---|---|
| Re. 30,405 | 9/1980 | Fischer ........................... | 525/193 |
| 4,128,606 | 12/1978 | Furutachi et al. ................... | 525/322 |
| 4,140,732 | 2/1979 | Schnetger et al. ................... | 525/88 |
| 4,212,787 | 7/1980 | Matsuda et al. . | |
| 4,247,652 | 1/1981 | Matsuda et al. . | |
| 4,621,114 | 11/1986 | Watanabe . | |
| 5,001,182 | 3/1991 | Maruya et al. ................... | 524/427 |
| 5,118,753 | 6/1992 | Hikasa et al. ................... | 525/198 |
| 5,128,413 | 7/1992 | Yonekura et al. . | |
| 5,338,801 | 8/1994 | Eppert, Jr. ................... | 525/232 |
| 5,354,795 | 10/1994 | Ueno et al. ................... | 524/102 |
| 5,461,105 | 10/1995 | Saito . | |
| 5,733,980 | 3/1998 | Cozewith et al. ................... | 525/89 |
| 5,852,100 | 12/1998 | Sadatoshi et al. ................... | 525/89 |

FOREIGN PATENT DOCUMENTS

| | | |
|---|---|---|
| 0 269 274 A2 | 6/1988 | European Pat. Off. . |
| 0437096 A2 | 7/1991 | European Pat. Off. . |
| 36-11240 | 7/1961 | Japan . |
| 38-2126 | 3/1963 | Japan . |
| 38-3126 | 3/1963 | Japan . |
| 41-21785 | 6/1966 | Japan . |
| 51-136735 | 11/1976 | Japan . |
| 55-3374 | 1/1980 | Japan . |
| 56-15740 | 4/1981 | Japan . |
| 56-15743 | 4/1981 | Japan . |
| 57-55952 | 3/1982 | Japan . |
| 57-207630 | 12/1982 | Japan . |
| 58-17139 | 2/1983 | Japan . |
| 5-59251 | 3/1983 | Japan . |
| 58-111846 | 7/1983 | Japan . |
| 59-98157 | 6/1984 | Japan . |
| 5-230321 | 7/1993 | Japan . |
| 6-145437 | 5/1994 | Japan . |

OTHER PUBLICATIONS

Seikei–Kakou vol. 6, No. 10 (1993), 669–675.
Polymer Preprints, Japan vol. 41, No. 9 (1992), 3888–3890.
Polymer Preprints, Japan vol. 42, No. 9 (1993), 3926–3928.
English translation of, Kakugo et al., "Impact–Resistant Polypropylene", Sumitomo Kagaku, pp. 22–32, 1979–1, Ralph McElroy Co., Austin TX.
Lenz, "Organic Chemistry of Synthetic High Polymers", Interscience Publishers, New York, pp250–251 (1967).
Abstract of JP07025939, Jan. 27, 1995.
Abstract of JP6093142 Apr. 5, 1994.

*Primary Examiner*—Donald R. Wilson
*Attorney, Agent, or Firm*—Pillsbury Madison & Sutro LLP

[57] ABSTRACT

A thermoplastic resin composition including at least (1) a heat-treated composition obtained by heat-treating dynamically a specific polypropylene and an olefin copolymer rubber in the presence of an organic peroxide and a crosslinking agent and (2) a specified polypropylene. In addition, an inorganic filler can be added to the thermoplastic resin composition. These compositions are superior in mechanical properties such as flexural modulus, thermal rigidity resistance and impact resistance, and can be suitably used as materials for home electric parts and the like.

13 Claims, No Drawings

THERMOPLASTIC RESIN COMPOSITION

BACKGROUND OF THE INVENTION

1. Field of the Invention

The present invention relates to a thermoplastic resin composition. Particularly, the present invention relates to a thermoplastic resin composition comprising a polypropylene and an olefin copolymer rubber. This composition has superior mechanical properties such as flexural strength, thermal rigidity resistance and impact resistance. The composition is especially suitable as a material for preparing home electric parts, etc.

2. Discussion of the Related Art

In recent years, a crystalline propylene-ethylene block copolymer has been used as a forming material for such applications as, for example, home electric parts. This crystalline propylene-ethylene block copolymer exhibits a balance among such properties as flexural modulus, heat distortion temperature and impact strength; however, when used alone the block copolymer has a drawback insofar as it exhibits insufficient impact strength at low temperature.

Japanese Patent Publication (Unexamined) Nos. Sho 53-22552 (1983) and Sho 53-40045 (1983) disclose incorporating an ethylene-propylene copolymer rubber into the crystalline propylene-ethylene block copolymer for improving the low-temperature impact strength of the crystalline propylene-ethylene block copolymer. This composition, however, is inferior in flexural modulus and thermal properties such as heat distortion temperature and the like because of the addition of the ethylene-propylene copolymer rubber. To overcome this problem, it is disclosed in, for example, Japanese Patent Publication (Unexamined) Nos. Sho 51-136735 (1976) and Sho 53-64256 (1978), Sho 53-64257 (1978), Sho 57-55952 (1982), Sho 57-207630 (1982), Sho 58-17139 (1983), Sho 58-111846 (1983), and Sho 59-98157 (1984), and Japanese Patent Publication (Examined) No. Sho 55-3374(1980) and the like, to add an inorganic filler such as calcium carbonate, barium sulfate, mica, crystalline calcium silicate, talc and the like.

Further, recently, in Japanese Patent Publication (Unexamined) Nos. Hei 5-59251 (1993) and 5-230321 (1993), there is proposed a resin composition improved in flexural modulus, surface hardness and the like by varying the isotactic pentad fraction of propylene homopolymer portion in an ethylene-propylene block copolymer. In Japanese Patent Publication (Examined) Nos. Sho 36-11240 (1961), Sho 38-3126 (1963), Sho 41-21785 (1966) and the like, it is proposed that impact resistance is improved by adding a vulcanized rubber to olefinic plastics. However, blending of the vulcanized rubber reduces flowability, thereby impairing the appearance of the cured composition. To overcome this problem and improve flowability, there is proposed in Japanese Patent Publication (Examined) Nos. Sho 56-15740 (1981) and 56-15743 (1981) and the like, a composition prepared by blending a mineral oil type softening agent and a peroxide non-crosslinking type rubbery material. Further, in Japanese Patent Publication (Unexamined) No. Hei 6-145437 (1994), there is proposed a material having a good balance between impact strength and rigidity.

Recently, there has been an increasing demand for materials for preparing home electronic parts that exhibit increased thermal rigidity resistance. However, conventional materials do not exhibit improved thermal rigidity resistance without sacrificing low-temperature impact resistance, since low-temperature impact resistance and thermal rigidity resistance are antipodal properties to each other.

SUMMARY OF THE INVENTION

An object of the present invention is to provide a thermoplastic resin composition that exhibits an improved low-temperature impact strength and thermal rigidity resistance.

Another object of the present invention is to provide a thermoplastic resin composition that, when suitably blended with an inorganic filler, exhibits even further improved low-temperature impact strength and thermal rigidity resistance.

These an other objectives are achieved by an embodiment of the present invention that provides a thermoplastic resin composition prepared by melt-mixing polypropylene (preferably a crystalline propylene polymer) with a material obtained by dynamically heat-treating a mixture of polypropylene (preferably a crystalline propylene polymer) and an olefin copolymer rubber in the presence of an organic peroxide and crosslinking agent.

More specifically, according to this embodiment of the present invention, there is a provided a thermoplastic resin composition that includes at least:

a first component (1) being a heat-treated material obtained by dynamically heat-treating a mixture of, at least, about 10% by weight to about 50% by weight of a first crystalline propylene homopolymer and/or a first crystalline polymer composition prepared by homopolymerizing propylene and subsequently random copolymerizing propylene and ethylene (A) having a melt index measured according to JIS-K-6758 at 230° C. of about 0.5 g/10 min to about 10 g/10 min, with about 50% by weight to about 90% by weight of an olefin copolymer rubber (B) in the presence of organic peroxide and a cross-linking agent, and a second component (2) being a second crystalline propylene homopolymer and/or a second crystalline polymer composition prepared by homopolymerizing propylene and subsequently random copolymerizing propylene and ethylene (C), with the propylene homopolymer portion having a melt index measured according to JIS-K-6758 at 230° C. of about 30 g/10 min to about 150 g/10 min, and an isotactic pentad fraction of about 0.98 or more, wherein the resulting thermoplastic resin composition contains about 10% to about 40% by weight of the olefin copolymer rubber (B).

According to another embodiment of the present invention, a thermoplastic composition is prepared by blending an inorganic filler into the aforementioned thermoplastic resin composition.

According to a further embodiment of the present invention, a process is provided for preparing (e.g., mixing) the aforementioned thermoplastic resin compositions which, such that when said compositions are suitably prepared, they exhibit excellent low-temperature impact strength and thermal rigidity resistance properties.

These and other objects, features, and advantages of the present invention will become apparent from the following detailed description which illustrates, by way of example, the principles of the present invention.

DETAILED DESCRIPTION OF THE INVENTION

In the present invention, the first component includes a polymer (A) that is a first crystalline propylene homopolymer and/or a first crystalline polymer composition prepared by homopolymerizing propylene and subsequently random copolymerizing propylene and ethylene. The polymer (A) has a melt index of about 0.5 g/10 min to about 10 g/10 min at 230° C. The crystalline propylene homopolymer (referred to hereinafter as "propylene homopolymer") can be prepared by homo-polymerizing propylene with a Zieglar-Natta catalyst system. The crystalline polymer composition (referred to hereinafter as polymer composition or) has a propylene homopolymer portion as the first segment and propylene-ethylene random copolymer portion as the second segment, and can be prepared by homopolymerizing propylene and subsequently random copolymerizing propylene and ethylene. In the present invention, these polymers can be used alone or in combination.

A melt index measured according to JIS-X-6758 at 230° C. of the polymer (A) described above is preferably about 0.5 g/10 min to about 10 g/10 min, and more preferably about 3 g/10 min to about 9 g/10 min. A melt index of less than about 0.5 g/10 min can impair the appearance of a resulting shaped article because of low flowability at molding. The melt index of more than about 10 g/10 min leads to a decrease of mechanical property.

An ethylene content of the ethylene-propylene random copolymer portion in the ethylene-propylene block copolymer (A) preferably is about 20% by weight to about 70% by weight, and more preferably about 25% by weight to about 60% by weight.

In the ethylene-propylene block copolymer, a weight ratio (X) of propylene-ethylene random copolymer portion to the total block copolymer can be determined by measuring the quantity of the heat of fusion of crystal of each the propylene homopolymer portion and the total block copolymer and calculating from the following equations:

$$X = 1 - (\Delta Hf)_T / (\Delta Hf)_P$$

wherein:

$(\Delta Hf)_T$ denotes the quantity of the heat of fusion of the total block copolymer (cal/g), and $(\Delta Hf)_P$ denotes the quantity of the heat of fusion of the propylene homopolymer portion (cal/g).

The heat of fusion can be measured by using, for example, a differential scanning calorimeter such as one manufactured by Perkin Elmer Co., Ltd.

An ethylene content can be determined according to a calibration curve method by measuring each absorbance of characteristic absorption of methyl group and methylene group in IR spectrum of the block copolymer formed to a pressed sheet. The ethylene content of the ethylene-propylene copolymer portion can be calculated from the following equation by measuring the ethylene content of the total ethylene propylene block copolymer:

$$(C_2')_{EP} = (C_2')_T / X$$

wherein:

$(C_2')$ EP denotes ethylene content in the total block copolymer (% by weight), and $(C_2')$ T denotes ethylene content in the propylene-ethylene random copolymer portion (% by weight).

The olefinic copolymer rubber (B) used in the present invention preferably is selected from an ethylene-α-olefin copolymer and an ethylene-α-olefin-non-conjugated polyene terpolymer. As the α-olefin, propylene, butene-1, pentene-1, hexene-1, heptene-1, octene-1 and the like are suitable, and among these, propylene and butene-1 are preferred.

As the non-conjugated polyene, for example, a straight or branched chain non-conjugated diene such as 1,4-hexadiene, 1,6-octadiene; a cyclic non-conjugated diene such as 1,4-cyclohexadiene, dicyclopentadiene, 5-vinyl-2-norbornene, 5-ethylidene-2-norbornene; a triene such as 2,3-diisopropylidene-5-norbornene, 2-ethylidene-3-isopropylidene-5-norbornene are illustrative, and among them, 1,4-hexadiene, dicyclopentadiene and 5-ethylidene-2-norbornene are preferred.

It is also noted that the present invention is not limited to using only one olefinic copolymer rubber (B); rather, the use of a plurality of different olefinic copolymer rubbers (B) is encompassed by the present invention.

The ethylene content of the olefinic copolymer rubber (B) is preferably about 90% by weight to about 40% by weight of the rubber (B), an α-olefin content is preferably about 10% by weight to about 60% by weight of the rubber (B), and a non-conjugated diene content is preferably about 0% by weight to about 12% by weight of the rubber (B). When the ethylene content exceeds about 90% by weight, the ethylene component becomes excessive and, therefore, the crystallinity of the copolymer rubber increases, causing a decrease in the low-temperature impact strength as a result. On the other hand, when the ethylene content is less than about 40% by weight, a decomposition reaction (caused by the peroxide) is prone to proceed, thereby impairing the mechanical properties and appearance of the resulting molded-article. Therefore, the ethylene content is more preferably about 80% by weight to about 45% by weight of the copolymer rubber (B). Further, when a non-conjugated diene content exceeds about 12% by weight, it becomes difficult to control the cross-linking reaction.

It is preferable that the olefinic copolymer rubber (B) has a Mooney viscosity at 100° C. ($ML_{1+4}$ 100° C.) of about 10 to about 100, and more preferably about 20 to about 80. When the Mooney viscosity at 100° C. is less than about 10, the mechanical properties of the resulting article can become inferior; on the other hand, when the Mooney viscosity exceeds about 100, the flowability of the composition becomes inferior, which can result in a displeasing appearance of an injection-molded article.

The content of the olefinic copolymer rubber (B) relative to the total weight of the mixture of the propylene homopolymer and/or the ethylene-propylene block copolymer (A) and the olefinic copolymer rubber (B) is preferably about 50% by weight to about 90% by weight, and more preferably about 60% by weight to about 80% by weight of (A)+(B). When it is less than about 50% by weight, a decomposition reaction according to a peroxide proceeds insufficiently and it is not achieved to improve the mechanical properties of the article. When it exceeds about 90% by weight, a thermoplastic property hardly appears.

In addition, the content of the crystalline propylene homopolymer and/or crystalline ethylene-propylene block copolymer (A) is preferably about 10% to about 50% of the total weight of (A)+(B).

The examples of the organic peroxide used in the present invention include
2,5-dimethyl-2,5-di(t-butylperoxy)hexane,
2,5-dimethyl-2,5-di(t-butylperoxy)hexyne-3,
1,3-bis(t-butylperoxyisopropyl)benzene,
1,1-di(t-butylperoxy)-3,5,5-trimethylcyclohexane, 2,5-dimethyl-2,5-di(peroxybenzoyl)hexyne-3, dicumylperoxide and the like. There are no particular restrictions, and the peroxide can be suitably selected according to the desired melt-kneading condition.

The added amount of the organic peroxide can be selected in the range of about 0.01% to about 1.0% by weight per 100% by weight of (A)+(B). When the amount of the organic peroxide added is less than about 0.01% by weight, the cross-linking rate is too low; on the other hand, when the amount of organic peroxide exceeds about 1.0% by weight, it is difficult to control the cross-linking reaction.

As the cross-linking and or assistant used in the present invention, a bismaleimide such as, for example, N,N'-m-phenylene bismaleimide and toluylene bismaleimide, a multi-functional compound such as p-quinonedioxime, nitrobenzene, diphenylguanidine, trimethylolpropane, ethyleneglycol dimethacrylate and the like can be used, for example. As N,N'-m-phenylene bismaleimide, for example, SUMIFINE BM (Registered Trade Mark) (manufactured by Sumitomo Chemical Company Ltd.), HVA-2 (manufactured by E.I. Du Pont de Nemours & Company Ltd.) and the like can be used.

The added amount can be selected as within the range of about 0.01% to about 5.0% by weight per 100% by weight of (A)+(B). When the amount is less than about 0.01% by weight, the effect of the cross-linking reaction hardly appears; by contrast, when it exceeds about 5.0% by weight, the moldability of the composition is inferior. The amount of crosslinking agent added is preferably about 0.05% to about 2.0% by weight per 100% by weight of (A)+(B).

The heat-treated article of the present invention (in some cases, referred to as "dynamic heat-treated article") is obtained by heat-treating dynamically the propylene homopolymer and/or the ethylene-propylene block copolymer (A) and the olefinic copolymer rubber (B) in the presence of the above-mentioned organic peroxide and the cross-linking agent.

As the method heat-treating dynamically in the present invention, melt-kneading can be performed with a well-known apparatus for kneading such as a mixing roll, a Banbury mixer, a twin screw extruder, a kneader, a continuous mixer or the like at a temperature of about 160° C. to about 280° C. In this case, it is preferred to perform the melt-kneading in an inert gas such as nitrogen, carbon dioxide and the like.

In the present invention, it is preferred that the dynamic heat-treated article not include a mineral oilic softener commonly used for the improvement of a flowability and an appearance in connection with thermoplastic elastomers. A mineral oilic softener is not consistent with the objects of the present invention, since it tends to deteriorate rigidity and thermal resistance.

The second component includes as ingredient (C) a second propylene homopolymer (also referred to herein as "the propylene homopolymer") and/or a second polymer composition prepared by homopolymerizing propylene and subsequently random copolymerizing propylene and ethylene (also referred to herein as a "second polymer composition" or "ethylene-propylene block copolymer"). The second polymer composition is obtained by copolymerizing ethylene and propylene after homopolymerizing propylene. These may be used alone or as a mixture.

An ethylene content of an ethylene-propylene copolymer portion in the ethylene-propylene block copolymer (C) preferably should be about 20% by weight to about 70% by weight, and more preferably about 25% by weight to about 60% by weight of the block copolymer (C). An isotactic pentad fraction of a propylene homopolymer portion is preferably about 0.98 or more. When it is less than about 0.98, it is difficult to obtain a superior rigidity and a thermal resistance.

A melt index of the propylene homopolymer portion is preferably about 30 g/10 min to about 150 g/10 min. When it is less than about 30 g/10 min, the flowability is low and when it exceeds about 150 g/10 min, it causes the deterioration of the above-discussed mechanical properties. A propylene homopolymer portion of the ethylene-propylene block copolymer (C) can be obtained by removing propylene homopolymer from a polymerization vessel after homopolymerizing propylene at the polymerization. The propylene homopolymer portion means both the propylene homopolymer and the propylene homopolymer portion of the ethylene-propylene block copolymer (C).

An isotactic pentad fraction referred to herein is an isotactic chain in five monomer units of a crystalline polypropylene molecular chain measured by using a method published in Macromolecules, vol.6, 925(1973) by A. Zambelli et al, which is incorporated herein by reference, that is, $^{13}$C-NMR, and in other words, a propylene monomer unit ratio being the center of a chain wherein five propylene monomer units are meso-bonded successively. However, concerning an ascription of NMR absorption peak, it is to be performed in accordance with Macromolecules, Vol.8, 687 (1975), which also is incorporated herein by reference. An isotactic-pentad ratio is measured as an area ratio of a mmmm peak to total absorption peaks of $^{13}$C-NMR spectrum. An isotactic pentad ratio of CRM No. M19-14 Polypropylene PP/MWD/2 of NATIONAL PHYSICAL LABORATORY in U. K. measured according to this method was 0.944.

In the present invention, concerning a method blending the heat-treated article, and the propylene homopolymer and/or ethylene-propylene block copolymer (C), they can also be melt-kneaded with a well-known kneading machine in like manner as in the case of the aforementioned dynamic heat-treated article. The melt-kneading may be divided into two steps and may be carried out using a multi-step feeding type biaxial melt-kneading machine in one step.

The content of the olefinic copolymer rubber (B) in the thermoplastic resin composition of the present invention thus obtained preferably is about 10% by weight to about 40% by weight of the total resin composition. When it is less than about 10% by weight, the low-temperature impact strength is inferior; on the other hand, when it exceeds about 40% by weight, the flowability is inferior and the appearance of the molded-article may be poor. The content of the olefinic copolymer rubber (B) in the thermoplastic resin composition is more preferably about 12% by weight to about 30% by weight.

In the present invention, further, the rigidity and thermal resistance can be improved by adding inorganic fillers (D) to the above-mentioned thermoplastic resin composition comprising (A), (B) and (C). The added amount of the inorganic fillers (D) is about 5% to about 40% by weight of (A) to (D). When it is less than about 5% by weight, the improvement to the rigidity and thermal resistance is not significant, and when it exceeds about 40% by weight, the flowability of the composition deteriorates.

As the inorganic fillers (D), fillers that improve rigidity and thermal resistance may be suitable, and for example, calcium carbonate, barium sulfate, a mica, a crystalline calcium silicate, a talc, a glass fiber and the like are illustrative. Particularly, talc and glass fibers are preferred.

The talc preferably has an average particle size of about 1 $\mu$m to about 5 $\mu$m. When the average particle size is less than about 1 $\mu$m, problems such as a re-coagulation, bad dispersion and the like tend to appear. When the average particle size is more than about 5 $\mu$m, the improvement to rigidity and thermal resistance is not as pronounced. As a glass fiber, a chopped glass having a fiber diameter of about 4 $\mu$m to about 13 $\mu$m and treated with a silane-coupling agent is preferably used.

In the present invention, the aforementioned kneading apparatus can be similarly used for blending the inorganic fillers (D) after obtaining the above-mentioned thermoplastic resin composition comprising (A) to (C) in advance. Alternatively, the fillers (D) simultaneously can be blended with (C) when (C) is blended to the heat-treated article of (A) and (B). Usually, a method of adding and blending simultaneously (C) and (D) to the heat-treated article of (A) and (B) is adopted. Further, the thermoplastic resin composition relating to the present invention may contain thermal stabilizers, nucleating agents, ultra violet absorbers, lubricating agents, antistatic agents, flame retardants, pigments, dyes, other polymers and the like.

A thermoplastic resin composition and a process for preparing the same are disclosed in Japanese Application No. 7-106761, filed Apr. 28, 1995, the complete disclosure of which is incorporated herein by reference.

The following non-limiting examples serve to explain embodiments of the present invention in more detail.

EXAMPLES

The following methods were employed for measuring the physical properties in the Examples and the specification. In addition, a kneading apparatus was also employed.

(1) Melt index (MI) was performed according to a method prescribed in JIS-K-6758. The measurement temperature was 230° C., and the MI was measured under a load of 2.16 kg.

(2) Bending test was measured according to a method prescribed in JIS-K-7203. A test piece (having a thickness of 6.4 mm) molded by injection-molding was used and a flexural modulus was evaluated under conditions of span length of 100 mm and a loading speed of 2.0 mm/min. The measurement temperature was 23° C.

(3) Izod impact strength was measured according to a method prescribed in JIS-K-7110. A test piece (having a thickness of 6.4 mm) molded by injection-molding was used and a notched impact strength of the test piece notched after the molding was evaluated. A measurement temperature was 23° C. unless otherwise indicated. In other case except the temperature, a measurement was performed after modulating for 2 hours in a constant temperature bath at a fixed temperature.

(4) Rockwell hardness was measured according to a method prescribed in JIS-K-7202. A test piece (having a thickness of 6.4 mm) molded by injection-molding was used and evaluated by using a steel ball of R. A value was reported in accordance with an R scale.

(5) Heat distortion temperature was measured according to a method prescribed in JIS-K-7207. A test piece (having a thickness of 6.4 mm) molded by injection-molding was used, wherein the test piece formed a bending of 0.254 mm when a temperature was elevated at a rate of 2° C./min under a fiber stress of 4.6 kgf/cm$^2$.

(6) The Banbury mixer was a MIXTRON BB-16 MIXER having 2 wings-type rotor and 1 chamber volume of 17.7 l manufactured by Kobe Steel Works Ltd. was used.

(7) The twin screw kneading extruder employed was a TEX-44SS-30W-2V (a different-direction rotor type) having two screws of 44 mm×30 OL/D manufactured by Nippon Steel Works Ltd..

In the following Examples and Comparative Examples, the various abbreviations in Tables 1 and 2 represent the following materials PP: Propylene homopolymer
BC: Ethylene-propylene block copolymer rubber
EPR: Ethylene-propylene copolymer rubber
EBR: Ethylene-butene-1 copolymer rubber
EPDM: Ethylene-propylene-non-conjugated diene terpolymer rubber TALC: Talc
PO: Organic peroxide
  2,5-dimethyl-2,5-di(t-butylperoxy)hexane
BM: Cross-linking agent
  N,N'-m-phenylene bismaleimide

Example 1

30% by weight of a propylene homopolymer (PP-1) having an isotactic pentad fraction of a propylene homopolymer portion of 0.97 and a melt index of 8 g/10 min. and 70% by weight of an ethylene-propylene-non-conjugated diene terpolymer rubber (EPDM-1) having a propylene content of 50% by weight, 5-ethylidene-2-norbornene of the non-conjugated diene of 5.3% by weight and a Mooney viscosity at 100° C. of 43 were melt-kneaded in the presence of 0.04% by weight of 2,5-dimethyl-2,5-di(t-butylperoxy)hexane and 0.5% by weight of N,N'-m-phenylene bismaleimide with a Banbury mixer in an adiabatic state for 10 minutes and successively, passed through a roll to be pelletized with a sheet cutter (hereinafter, named as MB or MB pellets) (the first step).

Next, after 44% by weight of a propylene homopolymer (PP-3) having an isotactic pentad fraction of a propylene homopolymer portion of 0.98 and a melt index of 77 g/10 min., 36% by weight of an ethylene-propylene block copolymer (BC) having an ethylene-propylene copolymer portion content of 16.7% by weight and a melt index of 12 g/10 min. and 20% by weight of the MB pellets prepared in the first step were homogeneously blended with various kinds of stabilizers, were pelletized with a twin-axial kneading extruder at 200° C. (the second step), and test pieces were prepared with an injection-molding machine to be evaluated. MB and the compositions of homogeneous mixtures (compounds) are shown in Table 2 for reference. The results are shown in Table 4.

Examples 2 to 9

MB of the materials in Table 1 and the compositions in Table 2 were melt-kneaded with a Banbury mixer in an adiabatic state for 10 minutes and successively, passed through a roll to be pelletized with a sheet cutter and named as MB (the first step). The compounds of the compositions in Table 2 containing the MB pellets were pelletized with a twin-axial kneading extruder at 200° C. (the second step) and test pieces were prepared with an injection-molding machine to be evaluated. The results are shown in Table 4.

Comparative Examples 1 to 5

Compounds of the materials in Table 1 and the compositions in Table 3 were pelletized in like manner as the second step of Example 1 and test pieces were prepared to be evaluated. The results are shown in Table 4.

Comparative Examples 6 to 12

Compounds of the materials in Table 1 and the compositions in Table 3 were pelletized in like manner as the second step of Example 1 and test pieces were prepared to be evaluated. The results are shown in Table 5 in combination with Examples 2 and 6 for reference.

Example 10 and Comparative Examples 13 and 14

MB of the materials in Table 1 and the compositions in Table 4 were melt-kneaded with a Banbury mixer in an adiabatic state for 10 minutes and successively, passed through a roll to be pelletized with a sheet cutter and named as MB (the first step). The compounds of the compositions in Table 4 containing the MB pellets were pelletized with a twin-axial kneading extruder at 200° C. (the second step) and test pieces were prepared with an injection-molding machine to be evaluated. The results are shown in Table 6 in combination with Example 2 for reference.

TABLE 1

| Sample | | MI (230° C.) (g/10 min.) Total | MI (230° C.) (g/10 min.) PP portion of BC | Isotactic pentad fraction | Ethylene-propylene copolymer portion Content 1 (wt %) | Ethylene-propylene copolymer portion Content 2 (wt %) |
|---|---|---|---|---|---|---|
| Polypropyrene | PP-1 | 8 | — | 0.97 | — | — |
| | PP-2 | 7 | — | 0.99 | — | — |
| | PP-3 | 77 | — | 0.98 | — | — |
| | PP-4 | 68 | — | 0.99 | — | — |
| | PP-5 | 30 | — | 0.96 | — | — |
| | BC | 12 | 35 | 0.98 (PP portion) | 16.7 | 36.5 |

| Sample | | $ML_{1+4}$ 100° C. | α-olefin content | Nonconjugated diene content (wt %) |
|---|---|---|---|---|
| Rubber | EPR | 52 | 27 (propylene) | — |
| | EBR | 48 | 17 (butene-1) | — |
| | EPDM-1 | 43 | 50 (propylene) | 5.3 (EN) |
| | EPDM-2 | 88 | 28 (propylene) | 7.2 (EN) |

PP: Propylene homopolymer
BC : Ethylene-propyrene block copolymer
EPR: Ethylene-propyrene copolymer rubber
EBR: Ethylene-butene-1 copolymer rubber
EPDM: Ethylene-propyrene-nonconjugated terpolymer rubber
EN:5-Ethylidene-2-norbornene
Content 1: Content of ethylene propylene copolymer portion
Content 2: Ethylene content in ethylene propylene copolymer portion

TABLE 2

| Example | M B (wt %) PP-1 | PP-2 | EPDM-1 | PIB | OIL | PO | BM | Compound (wt %) PP-3 | PP-4 | PP-5 | BC | MB | EPR | EBR | EPDM-2 | TALC |
|---|---|---|---|---|---|---|---|---|---|---|---|---|---|---|---|---|
| 1 | 30 | — | 70 | — | — | 0.04 | 0.5 | 44 | — | — | 36 | 20 | — | — | — | — |
| 2 | — | 30 | 70 | — | — | 0.04 | 0.5 | 44 | — | — | 36 | 20 | — | — | — | — |
| 3 | 30 | — | 70 | — | — | 0.02 | 0.4 | — | 49 | — | 30 | 21 | — | — | — | — |
| 4 | 30 | — | 70 | — | — | 0.02 | 0.4 | — | 29 | — | 30 | 21 | — | — | — | 20 |
| 5 | 30 | — | 70 | — | — | 0.02 | 0.5 | — | 24 | — | 36 | 20 | — | — | — | 20 |
| 6 | — | 30 | 70 | — | — | 0.04 | 0.5 | 24 | — | — | 36 | 20 | — | — | — | 20 |
| 7 | 30 | — | 70 | — | — | 0.02 | 0.4 | — | 29 | — | 30 | 21 | — | — | — | 20 |
| 8 | 30 | — | 70 | — | — | 0.04 | 0.5 | — | 29 | — | 30 | 21 | — | — | — | 20 |
| 9 | — | 30 | 70 | — | — | 0.04 | 0.5 | — | 24 | — | 36 | 20 | — | — | — | 20 |
| 10 | — | 30 | 70 | — | — | 0.2 | 0.5 | 44 | — | — | 36 | 20 | — | — | — | — |

TALC: Talc (JR-39 manufactured by Nihon Talc Co. Ltd.)
PIB: Polyisobutylene (Exxon Vistanex L-100)
OIL: Parafinic process oil
PO: 2,5-dimethyl-2,5-di(t-butylperoxy)hexane
BM: N,N'-m-phenylene bismaleimide

TABLE 3

| Comparative Example | M B (wt %) PP-1 | PP-2 | EPDM-1 | PIB | OIL | PO | BM | Compound (wt %) PP-3 | PP-4 | PP-5 | BC | MB | EPR | EBR | EPDM-2 | TALC |
|---|---|---|---|---|---|---|---|---|---|---|---|---|---|---|---|---|
| 1 | — | — | — | — | — | — | — | 50 | — | — | 36 | — | 14 | — | — | — |
| 2 | — | — | — | — | — | — | — | 50 | — | — | 36 | — | — | 14 | — | — |
| 3 | — | — | — | — | — | — | — | 50 | — | — | 36 | — | — | — | 14 | — |
| 4 | — | — | — | — | — | — | — | 42 | — | — | 22 | — | — | — | 16 | 20 |
| 5 | — | — | — | — | — | — | — | — | 42 | — | 22 | — | 6 | 8 | 2 | 20 |
| 6 | — | 23 | 54 | — | 23 | 0.04 | 0.5 | 38 | — | — | 36 | 26 | — | — | — | — |
| 7 | 15 | — | 54 | 8 | 23 | 0.3 | 0.5 | 41 | — | — | 36 | 23 | — | — | — | — |
| 8 | — | 30 | 70 | — | — | 0.04 | 0.5 | — | — | 71 | — | 29 | — | — | — | — |

TABLE 3-continued

| Comparative Example | M B (wt %) | | | | | | | Compound (wt %) | | | | | | | | |
|---|---|---|---|---|---|---|---|---|---|---|---|---|---|---|---|---|
| | PP-1 | PP-2 | EPDM-1 | PIB | OIL | PO | BM | PP-3 | PP-4 | PP-5 | BC | MB | EPR | EBR | EPDM-2 | TALC |
| 9 | 15 | — | 54 | 8 | 23 | 0.3 | 0.5 | — | — | 68 | — | 32 | — | — | — | — |
| 10 | — | 23 | 54 | — | 23 | 0.04 | 0.5 | 24 | — | — | 36 | 20 | — | — | — | 20 |
| 11 | — | 30 | 70 | — | — | 0.04 | 0.5 | — | — | 51 | — | 29 | — | — | — | 20 |
| 12 | 15 | — | 54 | 8 | 23 | 0.3 | 0.5 | — | — | 48 | — | 32 | — | — | — | 20 |
| 13 | — | 30 | 70 | — | — | — | 0.5 | 44 | — | — | 36 | 20 | — | — | — | — |
| 14 | — | 30 | 70 | — | — | 0.01 | 0.5 | 44 | — | — | 36 | 20 | — | — | — | — |

TABLE 4

| Unit | MI g/10 min. | Specific gravity | Flexural modulus kg/cm$^2$ | Izod Impact | | HDT °C. | Roackwell hardness R scale |
|---|---|---|---|---|---|---|---|
| | | | | 23° C. kg · cm/cm | −30° C. kg · cm/cm | | |
| Example | | | | | | | |
| 1 | 20 | 0.902 | 11500 | 17 | 4.6 | 114 | 80 |
| 2 | 20 | 0.902 | 11500 | 14 | 4.5 | 113 | 81 |
| 3 | 16 | 0.902 | 12100 | 12 | 4.1 | 115 | 83 |
| 4 | 8 | 1.034 | 22800 | 21 | 4.1 | 137 | 73 |
| 5 | 8 | 1.038 | 23500 | 27 | 4.1 | 141 | 73 |
| 6 | 11 | 1.035 | 23100 | 22 | 4.0 | 140 | 75 |
| 7 | 9 | 1.039 | 24200 | 21 | 3.8 | 141 | 74 |
| 8 | 8 | 1.036 | 22700 | 31 | 4.1 | 139 | 75 |
| 9 | 11 | 1.039 | 24200 | 24 | 3.7 | 142 | 77 |
| Comparative Example | | | | | | | |
| 1 | 26 | 0.900 | 12400 | 7.3 | 2.6 | 111 | 86 |
| 2 | 26 | 0.904 | 13400 | 6.8 | 2.0 | 116 | 89 |
| 3 | 25 | 0.902 | 13300 | 5.9 | 2.7 | 113 | 88 |
| 4 | 17 | 1.035 | 23500 | 7.6 | 2.9 | 137 | 78 |
| 5 | 19 | 1.040 | 26700 | 7.1 | 2.3 | 145 | 85 |

TABLE 5

| Unit | MI g/10 min. | Specific gravity | Flexural modulus kg/cm$^2$ | Izod Impact | | HDT °C. | Roackwell hardness R scale |
|---|---|---|---|---|---|---|---|
| | | | | 23° C. kg · cm/cm | −30° C. kg · cm/cm | | |
| Example | | | | | | | |
| 2 | 20 | 0.902 | 11500 | 14 | 4.5 | 113 | 81 |
| 6 | 11 | 1.035 | 23100 | 22 | 4.0 | 140 | 75 |
| Comparative Example | | | | | | | |
| 6 | 28 | 0.902 | 9700 | 12 | 3.3 | 107 | 89 |
| 7 | 28 | 0.902 | 10100 | 20 | 4.1 | 107 | 66 |
| 8 | 12 | 0.899 | 9300 | 17 | 4.4 | 108 | 63 |
| 9 | 20 | 0.900 | 7400 | 19 | 4.3 | 98 | 30 |
| 10 | 14 | 1.040 | 21000 | 13 | 3.0 | 134 | 66 |
| 11 | 8 | 1.034 | 20300 | 20 | 4.0 | 131 | 58 |
| 12 | 12 | 1.035 | 17900 | 25 | 4.2 | 121 | 25 |

60

TABLE 6

|  | Unit | MI g/10 min. | Specific gravity | Flexural modulus kg/cm² | Izod Impact 23° C. kg · cm/cm | Izod Impact −30° C. kg · cm/cm | HDT ° C. | Roackwell hardness R scale |
|---|---|---|---|---|---|---|---|---|
| Example | | | | | | | | |
| 2 | | 20 | 0.902 | 11500 | 14 | 4.5 | 113 | 81 |
| 10 | | 21 | 0.902 | 11500 | 14 | 4.5 | 111 | 81 |
| Comparative Example | | | | | | | | |
| 13 | | 23 | 0.901 | 11900 | 9 | 3.1 | 109 | 85 |
| 14 | | 20 | 0.902 | 11900 | 13 | 3.3 | 105 | 84 |

To summarize, according to the present invention, there is provided a thermoplastic resin composition comprising a heat-treated composition (1) obtained by dynamically heat-treating a specific polypropylene and an olefin copolymer rubber in the presence of an organic peroxide and a crosslinking agent. The specific polypropylene constitutes about 10% to about 50% by weight of the specific polypropylene and the olefin copolymer rubber combined. This heat-treated composition is mixed with a crystalline polypropylene (2) to form the thermoplastic composition. In addition, an inorganic filler can be incorporated into the above-described thermoplastic resin composition.

These resulting compositions are superior in mechanical properties, particularly, for example, flexural modulus, thermal rigidity resistance and impact resistance, and can be suitably used for home electric parts and the like.

Although the present invention has been described in detail with reference to its presently preferred embodiments, it will be understood by those of ordinary skill in the art that various modifications and improvements to the present invention are believed to be apparent to one skilled in the art. Accordingly, no limitation upon the invention is intended, except as set forth in the appended claims.

What is claimed is:

1. A thermoplastic resin composition consisting essentially of:
   a first component being a dynamically heat-treated mixture formulated from:
      a first crystalline propylene homopolymer, a first crystalline polymer composition prepared by homopolymerizing propylene and subsequently random copolymerizing propylene and ethylene, or a combination of said first crystalline propylene homopolymer and said first crystalline polymer composition, having a melt index measured according to JIS K-7203 of 0.5 g/10 min to 10 g/10 min at 230° C.;
      an olefinic copolymer rubber, a weight ratio of said olefinic copolymer rubber to said first crystalline propylene homopolymer, said first crystalline polymer composition, or said combination thereof being about 50:50 to about 90:10;
      an organic peroxide; and
      a crosslinking aid; and
   a second component consisting essentially of a second crystalline polymer composition prepared by homopolymerizing propylene and subsequently random copolymerizing propylene and ethylene, or a mixture of said second crystalline polymer composition and a second crystalline propylene homopolymer, said second crystalline propylene homopolymer and said homopolymerized propylene of said second crystalline polymer composition having a melt index of about 30 g/10 min to about 150 g/10 min at 230° C. and an isotactic pentad fraction measured by $^{13}$C-NMR of about 0.98 or more,
   wherein said thermoplastic resin composition contains about 10% to about 40% by weight of the olefinic copolymer rubber.

2. A thermoplastic resin composition according to claim 1, wherein the olefinic copolymer rubber is an ethylene-α-olefin copolymer or an ethylene-α-olefin-non-conjugated polyene terpolymer having an ethylene content of about 40% to about 90% by weight, an α-olefin content of about 10% to about 60% by weight, and a non-conjugated polyene content of about 0% to about 12% by weight, and wherein said olefinic copolymer rubber has a Mooney viscosity ($ML_{1+4}100°$ C.) of about 10 to about 100.

3. A thermoplastic resin composition according to claim 2, wherein the α-olefin is propylene or butene-1.

4. A thermoplastic resin composition according to claim 1, wherein the organic peroxide is about 0.01% to about 1.0% by weight of a total weight of the first crystalline propylene homopolymer, the first crystalline polymer composition, and the olefinic copolymer rubber.

5. A thermoplastic resin composition according to claim 1, wherein the crosslinking agent is about 0.01% to about 5.0% by weight of the total weight of the first crystalline propylene homopolymer, the first crystalline polymer composition, and the olefinic copolymer rubber.

6. A thermoplastic resin composition according to claim 1, wherein said weight ratio is from about 20:80 to about 40:60.

7. A thermoplastic resin composition according to claim 1, wherein about 5% to about 40% by weight of an inorganic filler is blended to about 95% to about 60% by weight of the thermoplastic resin composition.

8. A thermoplastic resin composition according to claim 2, wherein about 5% to about 40% by weight of an inorganic filler is blended to about 95% to about 60% by weight of the thermoplastic resin composition.

9. A thermoplastic resin composition according to claim 3, wherein about 5% to about 40% by weight of an inorganic filler is blended to about 95% to about 60% by weight of the thermoplastic resin composition.

10. A thermoplastic resin composition according to claim 4, wherein about 5% to about 40% by weight of an inorganic filler is blended to about 95% to about 60% by weight of the thermoplastic resin composition.

11. An article prepared from the composition claim 1.

12. A thermoplastic resin composition according to claim 1, wherein said first component is formulated from a crystalline polypropylene homopolymer, an ethylene-propylenenon-conjugated diene terpolymer rubber, 2,5-dimethyl-2,5-di(t-butylperoxy)hexane, N,N'-m-phenylene bismaleimide.

13. A thermoplastic resin composition according to claim 1, wherein said second component comprises a mixture of said second crystalline polymer composition and said second crystalline polypropylene homopolymer.

* * * * *